US011999869B2

(12) United States Patent
Wang et al.

(10) Patent No.: US 11,999,869 B2
(45) Date of Patent: Jun. 4, 2024

(54) COATING COMPOSITIONS AND METHODS FOR APPLICATION UTILIZING A HIGH TRANSFER EFFICIENCY APPLICATOR

(71) Applicant: AXALTA COATING SYSTEMS IP CO., LLC, Wilmington, DE (US)

(72) Inventors: Shih-Wa Wang, Philadelphia, PA (US); Mei Wen, Philadelphia, PA (US); Michael Wolfe, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 17/804,311

(22) Filed: May 27, 2022

(65) Prior Publication Data

US 2022/0389231 A1    Dec. 8, 2022

Related U.S. Application Data

(60) Provisional application No. 63/193,627, filed on May 27, 2021.

(51) Int. Cl.
*C09D 4/06* (2006.01)
*C09D 5/00* (2006.01)

(52) U.S. Cl.
CPC ............... *C09D 4/06* (2013.01); *C09D 5/00* (2013.01)

(58) Field of Classification Search
CPC ............................ C08F 220/52; C09D 4/06
See application file for complete search history.

(56) References Cited

U.S. PATENT DOCUMENTS

| 6,297,320 B1 | 10/2001 | Tang et al. |
| 7,824,015 B2 | 11/2010 | Pauly |
| 7,858,692 B2 | 12/2010 | Paquet, Jr. et al. |

(Continued)

FOREIGN PATENT DOCUMENTS

| EP | 3229975 A1 | 10/2017 |
| JP | 2003245606 A | 9/2003 |

(Continued)

OTHER PUBLICATIONS

EPO, Extended Search Report. dated Sep. 30, 2022.

*Primary Examiner* — Dah-Wei D. Yuan
*Assistant Examiner* — Andrew J Bowman
(74) *Attorney, Agent, or Firm* — Lorenz & Kopf, LLP

(57) ABSTRACT

Methods and coating compositions for application to a substrate utilizing a high transfer efficiency applicator are provided. An exemplary method includes providing the coating composition to the high transfer efficiency applicator; applying the coating composition onto the substrate utilizing a high transfer efficiency applicator to form an applied layer, wherein a loss of volatiles after application through the high transfer efficiency applicator is less than about 1 weight percent based on a total weight of the coating composition; performing a partial polymerization via radiation of the applied layer; and after performing the partial polymerization of the applied layer, thermally curing and drying the applied layer. An exemplary coating composition has a pre-application viscosity, at a shear rate of $1000\ s^{-1}$, of less than about 100 centipoise (cP), and a post-radiation-exposure viscosity at a shear rate of $0.1\ s^{-1}$ of from about 500 cP to about 150,000 cP.

14 Claims, 3 Drawing Sheets

(56) References Cited

U.S. PATENT DOCUMENTS

| | | | |
|---|---|---|---|
| 8,091,987 B2 | 1/2012 | Van Den Bergen et al. | |
| 10,814,643 B2 | 10/2020 | Herre et al. | |
| 2004/0217202 A1 | 11/2004 | Hynes | |
| 2009/0304936 A1 | 12/2009 | Nakazawa | |
| 2015/0375258 A1 | 12/2015 | Fritz et al. | |
| 2020/0062877 A1* | 2/2020 | Knopf | C08F 220/52 |

FOREIGN PATENT DOCUMENTS

| | | |
|---|---|---|
| JP | 2003276178 A | 9/2003 |
| WO | 2006137569 A1 | 12/2006 |
| WO | 2011021052 A2 | 2/2011 |
| WO | 2017180496 A1 | 10/2017 |
| WO | 2018206309 A1 | 11/2018 |
| WO | 2020109025 A1 | 6/2020 |

\* cited by examiner

COATING COMPOSITIONS AND METHODS FOR APPLICATION UTILIZING A HIGH TRANSFER EFFICIENCY APPLICATOR

CROSS-REFERENCE TO RELATED APPLICATIONS

This application claims the benefit of U.S. Provisional Application Ser. No. 63/193,627, filed May 27, 2021, the disclosure of which is incorporated herein by reference.

TECHNICAL FIELD

The technical field generally relates to coating compositions and methods for application to a substrate, and more particularly, to coating compositions and methods for overspray free application to substrates utilizing high transfer efficiency applicators.

BACKGROUND

In order to develop liquid coating for overspray free high transfer efficiency application, extra solvent and/or a low-viscosity solution is typically required for reliable jetting compared to that of conventional spray process. These requirements make sag control more difficult than conventional spray application for two reasons. First, for conventional spray application, significant volatile loss occurs due to a broad distribution of droplet sizes, including a substantial fraction less than 20 microns, and the large throw distance between spray head and substrate (such as from 10 to 30 cm). In contrast for the high transfer efficiency applicators of interest here, the drop or stream diameter is very uniform in size (such as from 20 to 300 microns), does not contain fine droplets less than about 20 microns, and are applied with a very short throw distance of only 0.1 to 3 cm. Because of these differences, while significant solvent evaporation typically occurs for spray application resulting in viscosity increase and consequently increased sag resistance, for overspray free high transfer efficiency applicators, the volatile loss is minimal and viscosity buildup will not occur. Second, for conventionally spray applied coatings, incorporation of rheology control agents can impart pseudoplastic behavior which will resist sag after coating application on the substrate. However, many of these rheology control agents cannot be used for overspray free high transfer efficiency applicators because they impede the desired flow and leveling required to achieve good appearance as well as degrading jetting reliability.

Accordingly, it is desirable to provide sag-resistant coating compositions and methods suitable for overspray free application to a substrate by utilizing a high transfer efficiency applicator that can also permit coating flow and leveling required for good appearance. Furthermore, other desirable features and characteristics will become apparent from the subsequent detailed description and the appended claims, taken in conjunction with this background.

BRIEF SUMMARY

Sag resistant coating compositions for application to a substrate utilizing a high transfer efficiency applicator and methods for forming layer of coating compositions on substrates are provided.

An exemplary method of applying a coating composition to a substrate utilizing a high transfer efficiency applicator to form a coating layer disposed on the substrate includes providing the coating composition to the high transfer efficiency applicator. Further, the method includes applying the coating composition onto the substrate utilizing a high transfer efficiency applicator to form an applied layer, wherein a loss of volatiles after application through the high transfer efficiency applicator is less than about 1 weight percent based on a total weight of the coating composition. Also, the method includes performing a partial polymerization via radiation of the applied layer. The method further includes, after performing the partial polymerization of the applied layer, thermally curing and drying the applied layer. In the exemplary method, the coating composition comprises: a thermal binder; a radiation-polymerizable binder; optionally, a photo-initiator; optionally, a thermal-initiator; optionally, a pigment; and a liquid carrier. The exemplary coating composition has a pre-application viscosity, at a shear rate of $1000$ $s^{-1}$, of less than about 100 centipoise (cP). The exemplary coating composition has a post-radiation-exposure viscosity at a shear rate of $0.1$ $s^{-1}$ of from about 500 cP to about 150,000 cP. Also, the thermal binder is a polymer or resin with crosslinkable groups selected from the group consisting of hydroxyl, acetoacetoxy, carboxyl, primary amine, secondary amine, epoxy and a combination thereof and crosslinking components selected from the group consisting of polyisocyanate, blocked polyisocyanate, polyamine, ketimine, melamine, epoxy, polyacid and a combination thereof.

In another embodiment, a coating composition is provided for application to a substrate utilizing a high transfer efficiency applicator. For the coating composition, a loss of volatiles after application through the high transfer efficiency applicator is less than about 0.5 weight percent based on a total weight of the coating composition. The exemplary coating composition comprises a radiation-polymerizable binder. Further, the exemplary coating composition has a pre-application viscosity at a shear rate of $1000$ $s^{-1}$ of less than about 100 centipoise (cP). Also, the coating composition has a post-radiation-exposure viscosity at a shear rate of $0.1$ $s^{-1}$ of from about 500 cP to about 150,000 cP.

In yet another embodiment, a method for forming a layer of a coating composition on a substrate is provided. The method includes applying the coating composition onto the substrate utilizing a high transfer efficiency applicator to form an applied layer, wherein a loss of volatiles after application through the high transfer efficiency applicator is less than about 0.5 weight percent based on a total weight of the coating composition. Further, the method includes, after leveling of the applied layer, performing a partial polymerization via radiation of the applied layer. Also, the method includes, after performing the partial polymerization of the applied layer, thermally curing and drying the applied layer.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
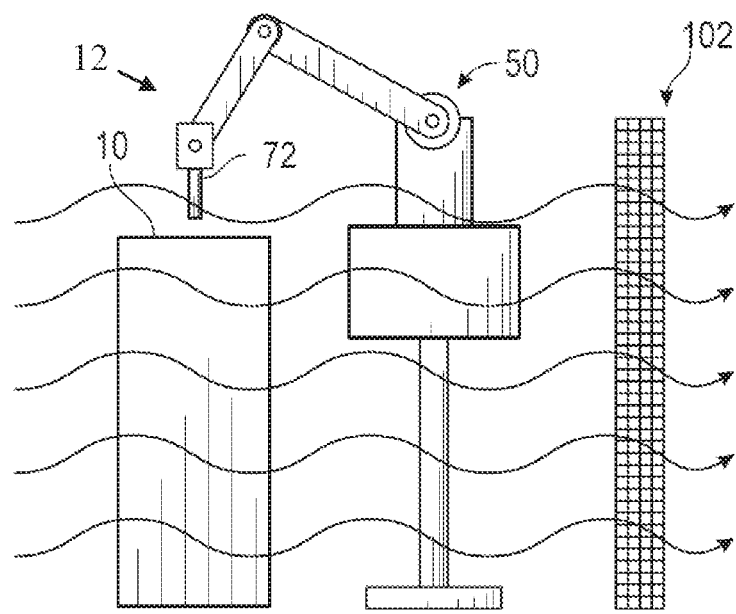
FIG. 1 is a perspective view illustrating a non-limiting embodiment of a system for applying the coating composition to the substrate utilizing the high transfer efficiency applicator in accordance with embodiments herein.

The following detailed description is merely exemplary in nature and is not intended to limit coating compositions or methods as described herein. Furthermore, there is no intention to be bound by any theory presented in the preceding background or the following detailed description.

As used herein, "a," "an," or "the" means one or more unless otherwise specified. The term "or" can be conjunctive or disjunctive. Open terms such as "include," "including," "contain," "containing" and the like mean "comprising." The term "about" as used in connection with a numerical value denotes an interval of accuracy, familiar and acceptable to a person skilled in the art. In general, such interval of accuracy is ±ten percent. Thus, "about ten" means nine to eleven. All numbers in this description indicating amounts, ratios of materials, physical properties of materials, and/or use are to be understood as modified by the word "about," except as otherwise explicitly indicated. As used herein, the "%" described in the present disclosure refers to the weight percentage (wt %) unless otherwise indicated, and % or wt % is in reference to the total weight of the coating composition.

Exemplary coating compositions may be utilized to coat any type of substrate known in the art, such as metal or non-metal substrates. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport.

As described herein, coating compositions are provided for use with high transfer efficiency applicators. During operation of a high transfer efficiency applicator, a liquid coating composition or paint is ejected from one or more nozzles of the high transfer efficiency applicator in an engineered/controlled fashion that creates a fine stream, that may or may not breakup into droplets. This stream is targeted to the substrate such that drops arrive at specific locations to potentially form a continuous film or pattern on the subject. As a result, in many embodiments, there is essentially no overspray (drops missing their target) and nearly 100% transfer efficiency (all paint goes to targeted location on the substrate). As will be appreciated by one of skill in the art, some allowance is made for start-up and stopping the high transfer efficiency applicator. Devices of this type can be described as drop-on-demand, stream-on demand, overspray-free, or ultra-high transfer efficiency applicators. These devices are different from spray atomization devices and techniques wherein energy, such as pneumatic, hydraulic, or centrifugal, energy, is introduced to create a partially controlled, random distribution of droplet sizes, trajectories and speeds, and wherein some additional mechanism, e.g. electrostatics and or shaping air, then guides a paint droplet cloud to a substrate. Relative to traditional paint spray, there is always some overspray and transfer efficiency loss.

The high transfer efficiency applicator itself may be any known in the art. For example, in various embodiments, the applicator is as described in one or more of patent numbers US20150375258A1, US20040217202 A1, US 2009/0304936 A1, U.S. Pat. No. 7,824,015 B2, U.S. Pat. No. 8,091,987 B2, WO 2018/206309 A1, each of which are expressly incorporated herein in their entirety for use in various non-limiting embodiments. The applicator may be alternatively described as a print head. The high transfer efficiency applicator has an application efficiency which is greater than 80%, such as greater than 90%, 95%, or 99%, so that substantially the whole of the applied coating medium is entirely deposited on the component without any noteworthy overspray occurring.

Because significant solvent evaporation does not occur during application of the coating composition via the high transfer efficiency applicator, the coating composition exhibits a limited loss of volatiles after application through the high transfer efficiency applicator. For example, an exemplary coating composition loses less than about 3 weight percent based on a total weight of the coating composition, such as less than about 2 weight percent based on a total weight of the coating composition, for example less than about 1 weight percent based on a total weight of the coating composition, such as less than about 0.5 weight percent based on a total weight of the coating composition, or less than about 0.2 weight percent based on a total weight of the coating composition Exemplary coating compositions are utilized to form a coating layer that may be utilized as a basecoat, a clearcoat, a color coat, a top coat, a single-stage coat, a mid coat, a primer, a sealer, or combinations thereof. In certain embodiments, the coating composition is utilized to form a basecoat coating layer. The term "basecoat" refers to a coating that is opaque and provides most color, hiding (also known as "opacity") and visual appearance. A basecoat typically contains color pigments, effect pigments such as metallic flakes pigments, rheology control agent, UV absorber and other coating additives. The term "basecoat coating composition" refers to a coating composition that forms a basecoat. The term "basecoat layer" refers to a coating layer that forms a basecoat coating composition. A basecoat layer can be formed by applying one or more layers of the same or different basecoat coating compositions. In automotive coatings, a substrate is typically coated with a primer layer for protection and adhesion, then a basecoat layer over the primer layer, optionally a sealer on top of primer, for most of protection, color and most of visual appearance, and subsequently a clearcoat layer over the basecoat layer for further protection and visual appearance. Sometimes, a single coating layer, referred to as "top coat" can be used to provide the function of both the basecoat and the clearcoat. Additional coating layer can also be used. For example, a metal substrate can be treated with a phosphate material and coated with an electrocoat layer before applying the primer layer.

The term "mid coat" or "mid coat layer" refers to a colored non-opaque coating positioned between a basecoat layer and a clearcoat layer in a multi-layer coating system. To achieve some unique and attractive colors or visual effects, the automobile industry and other coating end use applications can use multi-layer coatings having three or more coating layers instead of the traditional "basecoat and clearcoat" two-layer coating system. The multi-layer system can usually comprise at least a first colored and opaque basecoat layer, a second non-opaque color coat applied over at least a portion of the basecoat layer, and a third clearcoat layer applied over at least a portion of the second non-opaque color coating layer. The second non-opaque color coat is typically referred to as a mid coat layer, which contains colored pigments. The mid coat is typically formulated to be non-opaque so the color of the basecoat underneath can be visible through the mid coat.

Exemplary coating compositions described herein can be formulated as one-pack (1K) or two-pack (2K) coating composition, such as a 1K bake, 2K bake, or 2K room temperature composition. One-pack coating compositions may be air-dry coatings or un-activated coatings. The term "air-dry coating" or "un-activated coating" refers to a coating that dries primarily by solvent evaporation and does not require crosslinking to form a coating film having desired properties. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition.

"Two-pack coating composition" or "two component coating composition" means a thermoset coating composition comprising two components stored in separate containers. These containers are typically sealed to increase the shelf life of the components of the coating composition. The components are mixed prior to use to form a pot mix. The pot mix is applied as a layer of desired thickness on a substrate surface, such as an automobile body or body parts. After application, the layer is cured under ambient conditions or bake cured at elevated temperatures to form a coating on the substrate surface having desired coating properties, such as high gloss, smooth appearance, and durability.

Embodiments herein provide a liquid coating composition with sufficient jettability while exhibiting sufficient sag control of the liquid coating after deposition. While jettable fluid coating compositions, i.e., fluid coating compositions that are applied by a high transfer efficiency applicator such as a print head or nozzle, are limited to a low viscosity at jetting for practical application by the high transfer efficiency applicator. After application, the applied coating layer could experience poor sag performance if the low-shear rate viscosity is too low after application. On the other hand, the applied coating layer could show poor appearance due to lack of flow and leveling if the post application low-shear rate viscosity is too high. As described herein, fluid compositions are provided with a low viscosity at jetting for flow through a high transfer efficiency applicator, and are further designed for an increase in viscosity at desired timing after application, i.e., after deposition on a substrate, to improve appearance and sag performance, i.e., minimize or eliminate sag.

For example, as described herein, certain embodiments include adding a small amount of radiation reactive or radiation-polymerizable binder, such as monomer/oligomer, into the coating composition and performing radiation exposure after the wet film deposition. The radiation exposure causes the viscosity of the jetted coating to increase rapidly, such as within seconds. Further, the radiation exposure can be performed within a selected time after coating deposition, such as from seconds to minutes. In exemplary embodiments, the coating composition need not be fully cured to achieve sufficient sag control. Rather a partial polymerization process can provide the increased viscosity after printing and before the full baking/curing process. As a result, the coating composition is provided with sufficient flow and leveling immediately after the coating composition is deposited onto the substrate, and the viscosity of deposited paint can be increased rapidly through partial polymerization in a short period of time to prevent sagging (in seconds to minutes after deposition).

As noted above, exemplary embodiments described herein deal with the viscosity limitation of jettable fluid compositions, i.e., fluid compositions that are jetted through a high transfer efficiency applicator, such as a print head or nozzle, and are not atomized. For practical use with such high transfer efficiency applicators, a fluid coating composition must have a viscosity below an applicator threshold.

As described herein, fluid compositions for use with high transfer efficiency applicators are provided with a suitable viscosity for printing. Such viscosity is measured at the temperature of the fluid composition when being printed by the applicator. In an exemplary embodiment, the viscosity of the fluid composition is from about 25 to about 140 centipoise (cP) or milliPascal-second (mPa·s) at a shear rate of $1000\ s^{-1}$, such as from about 25 to about 120 cP (mPa s) at a shear rate of $1000\ s^{-1}$, or from about from about 25 to about 100 cP (mPa·s) at a shear rate of $1000\ s^{-1}$.

In an exemplary embodiment, a partial polymerization process is utilized to increase in viscosity of the applied composition. After partial polymerization, the applied composition may have a viscosity, measured at a shear rate of 0.1 $s^{-1}$, of at least 500 cP, such as at least 1000 cP, for example at least 2000 cP, for example at least 5000 cP. After partial polymerization, the viscosity at a shear rate of 0.1 s−1 is less than 150,000 cP, such as less than 120,000 cP, less than 100,000 cP, less than 80,000 cP, or less than 50,000 cP.

Partial Polymerization

In exemplary embodiments, a radiation-activatable, fast partial polymerization method is initially used after application of the composition to increase the viscosity of the applied fluid coating composition. As a result of the increased viscosity of the applied fluid composition, sagging of the applied fluid composition is reduced or eliminated, i.e., sag performance is improved.

As used herein, "partial polymerization" refers to an incomplete polymerization process of radiation-polymerizable binder, in which the ultimately desired cure/crosslinking, and resulting physical properties, is not achieved. The ultimately desired cure/crosslinking may be attained during a full or complete polymerization stage, such as during a thermal bake process, utilizing a different process chemistry, such as a melamine cure. In the full or complete polymerization stage, solvent drying, curing of the partially polymerized radiation-polymerizable binder, and curing of the remaining binders of the initial composition such as melamines and polyols, polyols and isocyanates, amines and isocyanates, or a combination of different binder chemistries take place. Curing of the partially polymerized radiation-polymerizable binder can occur upon heating of the coating through freeing up trapped free radicals generated in the radiation step, spontaneous thermal polymerization of acrylates, through an assistance of an added thermal initiator such as peroxides or azonitrile compounds, or through acrylate double bonds reacting with a co-reactant through Michael additions, such as an amine, thio, or acetoacetate.

The "partial polymerization" is desired as the coating layer needs high enough viscosity after radiation exposure for sag resistance but too high post-exposure viscosity can hinder further solvent drying and cause non-uniform final thermal cure and result in poor final appearance.

In exemplary embodiments, the radiation-activatable, fast partial polymerization method is performed within a desired time after deposition for a desired duration. For example, the applied coating may be exposed to the radiation, such as UV, Further, radiation, such as UV, may be directed at the applied fluid for a desired duration, such as for sixty seconds or less than sixty seconds, thirty seconds or less than thirty seconds, twenty seconds or less than twenty seconds, ten seconds or less than ten seconds, five seconds or less than five seconds, or one second or less than one second. As a result, the viscosity of the applied fluid is raised quickly to a threshold at which the applied fluid avoids sagging on non-horizontal surfaces. An exemplary partial polymerization process may be performed before significant solvent evaporation from the applied fluid.

An exemplary partial polymerization process may be performed using any suitable combination of binder and polymerization technique. For example, in certain embodiments, the partial polymerization process may be performed by ultraviolet-induced (UV-induced) free radical polymerization. In such embodiments, a photo-initiator and (a) UV-polymerizable monomer and/or oligomer, (b) vinyl-containing oligomer, polymer, and/or particles, and/or (c) UV-activatable functional-group-containing oligomer, polymer, and/or particles are included in the fluid composition. Upon application of UV to the applied fluid composition, the viscosity of the applied fluid composition is increased by UV-activated free-radical polymerization. In still other embodiments, the partial polymerization process may be performed by UV-induced cationic polymerization of a fluid composition including components selected for use with UV-induced cationic polymerization techniques.

In other embodiments, the partial polymerization process may be activated by visible light and the fluid composition may include components selected for use with visible light induced free radical or cationic polymerization.

In still other embodiments, the partial polymerization process may be performed by electron beam polymerization of a fluid composition including components selected for use with electron beam curing techniques.

Coating Composition

Exemplary coating compositions include various components, such as radiation-polymerizable binder material for initial partial polymerization including radiation-polymerizable monomers and/or radiation-polymerizable oligomers; vinyl-containing oligomers, acrylate and methacrylate-containing monomers, oligomers, and polymers, vinyl-containing polymers, vinyl-containing particles; photo-initiators; other binders that offer the main properties to the coating such as 1-K or 2-K reactive binders and crosslinkers reactive with the binders in a 2-K coating; carriers, such as organic solvents, water, and non-aqueous solvents; pigments; dyes; additives such as thermal initiators, catalysts, rheology control agents, flow control agents, conventional additives; or combinations thereof. In embodiments the carrier is selected from the group of water, a non-aqueous solvent, and a combination thereof. Conventional additives may include, but are not limited to, dispersants, antioxidants, UV stabilizers and absorbers, surfactants, wetting agents, leveling agents, fillers, plasticizers, antifoaming agents, anti-cratering agents, adhesion promoters, or combinations thereof. In embodiments, the coating composition is suitable for application to substrates utilizing the high transfer efficiency applicators on the basis that the coating composition includes certain components and/or includes certain components in a specific amount/ratio.

In embodiments, the coating composition is a solvent-borne coating composition when the organic solvent content is greater than 20 wt %, such as greater than 30 wt %, greater than 40 wt %, greater than 50 wt %, greater than 60 wt %, greater than 70 wt %, and less than 90 wt %, such as less than 80 wt %, each based on a total weight of liquid carrier in the coating composition. Non-limiting examples of suitable organic solvents can include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof. In embodiments, the evaporation rate of the solvent may have an impact on the suitability of the coating composition for printing. Certain co-solvents may be incorporated into the coating composition having increased or decreased evaporation rates thereby increasing or decreasing the evaporation rate of the coating composition.

In embodiments, the coating composition is a water-borne coating composition wherein the water content is greater than 30 wt %, such as greater than 40 wt %, for example greater than 50 wt %, such as greater than 60 wt %, for example greater than 70 wt %, such as greater than 80 wt %, or greater than 90 wt %, based on a total weight of liquid carrier in the coating composition.

Radiation-Polymerizable Binder

Use of radiation-polymerizable binder material for sag control may benefit both solvent-borne coating compositions and water-borne coating compositions in a wide variety of applications, such as, clear coating compositions, base coating compositions, pigmented mono coating compositions, primer surfacers and primer fillers. Of course, the radiation-polymerizable binder must be compatible with the selected coating composition.

As noted above, the exemplary coating composition includes a radiation-polymerizable binder or resin material including monomeric, oligomeric, or polymeric compounds that are polymerizable by ultraviolet (UV) light, visible light, electron beam (EB), or other suitable radiation.

Suitable radiation-polymerizable binder includes at least one free radically polymerizable component that includes at least one ingredient including free radically polymerizable functionality directly or indirectly pendant from a monomer, oligomer, or polymer backbone that participate in polymerization reactions via a free radical mechanism. Representative examples of free radically polymerizable functionality that is suitable include (meth)acrylate groups, olefinic carbon-carbon double bonds, allyloxy groups, alpha-methyl styrene groups, (meth)acrylamide groups, cyanate ester groups, (meth)acrylonitrile groups, vinyl ethers groups, combinations of these, and the like. The term "(meth)acryl", as used herein, encompasses acryl and/or methacryl unless otherwise expressly stated. Acryl moieties may be utilized relative to methacryl moieties in many instances, as acryl moieties tend to cure faster.

In illustrative embodiments, the free radically polymerizable binder component desirably includes one or more monomers such as mono- or multifunctional (meth)acrylates. Multi-functional monomers such as di- or multifunctional are preferred to build up viscosities quickly in the partial polymerization process. Examples of multifunctional (meth)acrylates include ethylene glycol di(meth)acrylate, hexanediol di(meth) acrylate, triethylene glycol di(meth)

acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, ethoxylated pentaerythritol tetra(meth)acrylate, dipentaerythritol penta(meth)acrylate, and neopentyl glycol di(meth)acrylate, divinyl benzene, combinations of these, and the like. Mono-functional (meth)acrylates can also be used as a mixture component. Examples of the mono-functional (meth)acrylates such as alkoxylated lauryl (meth)acrylate, cycloaliphatic (meth)acrylate monomers, 2(2-ethoxyethoxy) ethyl (meth)acrylate, stearyl (meth)acrylate, (meth)acrylate ester, tetrahydrofurfuryl (meth)acrylate, lauryl (meth)acrylate, caprolactone (meth)acrylate, alkoxylated tetrahydrofurfuryl (meth)acrylate, alkoxylated phenol acrylate, etc. which can be found in Sartomer's catalogs.

In illustrative embodiments, the free radically polymerizable binder component desirably includes oligomers or polymers such as (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated(meth)acrylics, (meth)acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth)acrylates, and (meth)acrylated oils. In practice, referring to a resin by its class (e.g., polyurethane, polyester, silicone, etc.) means that the resin includes at least one moiety characteristic of that class even if the resin includes moieties from another class. Thus, a polyurethane resin includes at least one urethane linkage but also might include one or more other kinds of polymer linkages as well. Representative examples of free radically polymerizable resin are described in U.S. Pat. Nos. 5,453,451, 5,773,487 and 5,830,937. Additional free radically polymerizable resins that would be suitable include those described in PCT Publication No. WO 02/077109. A wide range of such materials are commercially available.

Generally, if the molecular weight of a resin is too large, the compositions may tend to be too viscous for easy application. This also can impact the appearance of the resultant coating. The desired resin generally encompasses free radically polymerizable materials having a number average molecular weight of greater than 200, and of no more than 20,000, alternatively no more than 10,000, alternatively no more than 5000. As used herein, molecular weight refers to weight average molecular weight unless otherwise expressly stated.

Desirably, the average functionality of the radiation-polymerizable components (average number of functional groups per molecule) is higher than 2, or even higher than 2.5. The high functionality allows quick formation of large molecules without negatively impacting the initial viscosity.

The radiation-polymerizable binder can also contain functional groups other than acrylate or vinyl double bonds that can react with the other functional groups in the remaining binder such as melamine to form networks in the post-radiation, thermal cure process. One example of the functional groups can be hydroxyl functional groups, which can react with a melamine or isocyanate in the bake process to form binder networks. Examples of such radiation-polymerizable binder are hydroxyl functional monomers such as pentaerythritol triacrylate (Sartomer's SR444) and oligomers such as Sartomer's resin CN9062, CN9302, BASF's Laromer LR 8981, Laromer PE 55 F, Laromer PE 56 F, Laromer PE 46 T, Laromer LR 9004, Laromer PE 9024, Laromer PE 9045, Laromer PE 44 F, Laromer LR 8800, Laromer LR 8907, Laromer PE 9032, Laromer PE 9074, Laromer PE 9084, Laromer PE 9079, Laromer PE 9105, Laromer PE 9121, Laromer PE 9123, etc. The functional groups can also be epoxy (Sartomer's CN 153), acid, amine, blocked amine, isocyanate (BASF's Laromer LR 9000), blocked isocyanate, alkoxy silane, acetoacetyl, or other functional groups. In an exemplary embodiment, the radiation-polymerizable binder is CN9062, which has hydroxyl groups. In another exemplary embodiment, the radiation-polymerizable binder is Laromer LR 8981, which has hydroxyl groups.

In exemplary embodiments, di-functional and/or tri-functional acrylates are provided as the radiation-polymerizable binder material for free-radical polymerization in the presence of a photo-initiator and a radiation source in the initial partial polymerization process. For example, the composition may include trimethylolpropane triacrylate (TMPTA). In other embodiments, urethane acrylates may be used. For example, the composition may include the highly functional urethane acrylate as an oligomer commercially available as CN9062 from Sartomer Americas of Exton, Pennsylvania. The oligomer has a hydroxyl value of 85 mg KOH/g, which allows for further reaction of the OH groups with the remaining binder such as melamine. In other embodiments, liquid polyester-modified acrylic resin may be used. For example, the composition may include the liquid polyester-modified acrylic resin commercially available as Laromer® LR 8981 from BASF of Ludwigshafen, Germany. In exemplary embodiments, the oligomer has a hydroxyl value of 80 mg KOH/g, which allows for further reaction of the OH groups with the remaining binder such as melamine. In yet other embodiments, hexanediol diacrylate (HDDA) monomer is provided for partial polymerization. Other suitable monomers, oligomers, polymers, and/or particles may be used.

An exemplary composition includes a suitable amount of the radiation-polymerizable binder. An exemplary composition includes greater than about 0.5 wt % of the radiation-polymerizable binder based on total resin solid, such as greater than about 1 wt % of the radiation-polymerizable binder based on total resin solid, or greater than about 2 wt % of the radiation-polymerizable binder based on total resin solid. An exemplary composition includes less than about 60 wt % of the radiation-polymerizable binder based on total resin solid, such as less than about 40 wt % of the radiation-polymerizable binder based on total resin solid, or less than about 30 wt % of the radiation-polymerizable binder based on total resin solid. In other embodiments, an exemplary composition includes the radiation-polymerizable binder in an amount of at least 0.1, such as at least 0.2, for example at least 0.3, such as at least 0.4, for example at least 0.5, such as at least 0.6, for example at least 0.7, such as at least 0.8, for example at least 0.9, such as at least 1, for example at least 2, such as at least 5, for example at least 10, for example at least 15, such as at least 20, for example at least 25, such as at least 30 wt % based on the total resin solid. Further, in other embodiments, an exemplary composition includes the radiation-polymerizable binder in an amount of less than 60, such as less than 55, for example less than 50, such as less than 45, for example less than 40, such as less than 35, for example less than 30, such as less than 25, for example less than 20, such as less than 15 wt % based on the total resin solid.

Photo-Initiators

Photo-initiators are initiators that may be activated by actinic radiation and trigger free radical polymerization of the ethylenically unsaturated compounds. The activating radiation is actinic, for example UV and/or visible light having a wavelength of from 200 to 750 nm, such as from 200 to 600 nm, for example from 200 to 500 nm.

In exemplary coating compositions, the photo-initiator is provided to induce the initial partial polymerization process to increase the viscosity of the applied fluid coating composition within the desired time after deposition, as described above. While any suitable photo-initiator or mixtures of more than one photo-initiator may be utilized to pair with the wavelengths at peak irradiance generated by the radiation source, exemplary photo-initiators absorb a maximum amount of UV at the same wavelengths as the lamp peak irradiance.

Photo-initiators can be classified into type I and II initiators. Type I photo-initiators are unimolecular free-radical generators. Upon the absorption of UV-light, a specific bond within the initiator's structure undergoes homolytic cleavage to produce free radicals. Type I initiators are typically compounds containing benzoyl groups. For example, aromatic ketone compounds such as benzophenones combined with tertiary amines, alkylbenzophenone, 4,4'-bis(dimethylamino)benzophenone (Michler's ketone), anthrone and halogenated benzophenones or mixtures of the said types are Type I initiators. Type II photo-intiator require a co-initiator, usually an alcohol or amine, functional groups that can readily have hydrogens abstracted, in addition to the photo-initiator. The absorption of UV light by a Type-II photo-initiator causes an excited electron state in the photo-initiator that will abstract a hydrogen from the co-initiator, and in the process, splitting a bonding pair of electrons. Examples of Type II initiators are benzoin and its derivatives, benzilketals, acylphosphine oxides, for example 2,4,6-trimethyl-benzoyl-diphenylphosphine oxide, bisacylphosphine oxides, phenylglyoxylic acid ester, camphorquinone, α-aminoalkyl phenones, α,α-dialkoxyacetophenones and α-hydroxyalkylphenones.

In an exemplary embodiment, the photo-initiator may be a Type I or Type II photo-initiator or a combination of both used to initiate radical polymerization of, for example, unsaturated oligomers, e.g., acrylates, after exposure to UV light. It may also be advantageous to use mixtures of these compounds. Suitable initiators are commercially available, for example under the name Irgacure®, Darocur®, and Lucirin® (BASF SE, LudWigshafen, Germany) and Omnirad®, Omnipol®, Esacure® (IGM, Waalwijk. Netherlands). Such a photo-initiator may be used in combination with mono or multi-functional monomers. For a LED UV lamp that generates UV light at 395 nm, for example, the photo-initiator may be 2,4,6-trimethylbenzoyl-diphenyl phosphine oxide, commercially available as Omnirad TPO from IGM Resins of Waalwijk, Netherlands. Other photo-initiators suitable for LED 365 nm or 395 nm UV lamps include IGM's Omnirad TPO-L, Omnirad 819, Omnipol TP, Omnirad 379, Omnirad ITX, Omnirad DETX, Esacure 3644, Omnirad EMK, Omnipol 910, Omnirad BL 724, Omnirad BL 750, Omnipol 910, Omnipol TX, Omnipol BL 728, Omnirad 2022, Omnirad 2100, and ESACURE 3644. Difunctional or polyfunctional photo-initiators can be further used to speed up the initiation process. Examples include IMG's Esacure ONE, Esacure 1001 M, and ESACURE A 198.

While exemplary photo-initiators are provided, the choice of photo-initiator depends on the solubility of the photo-initiator in the composition.

When the UV source is a visible light source, visible range of the electromagnetic spectrum, i.e., irradiation at from 400 to 700 nm, such as about 400-500 nm, visible light photo-initiator should be used. A visible light photo-initiator will respond to visible light to initiate and induce curing. Visible light photo-initiators include bisacyl phosphine oxide photo-initiators such as Irgacure® 819. Other visible light curing photo-initiators can be used such as camphorquinone peroxyester initiators; 9-fluorene carboxylic acid peroxyesters; dl-camphorquinone; IRGACURE 784DC (photo-initiator based on substituted titanocenes); two-component initiators including a dye and electron donor; three-component initiators including a dye, electron donor and oxidant; and combinations thereof. These visible light photo-initiators may be used in conjunction with the bisacyl phosphine oxide photo-initiators to achieve the desired effect. As regards two component initiators, suitable dyes include, but are not limited to camphorquinone, 5,7-diiodo-3-butoxy-6-fluorone, rose bengal, riboflavin, eosin Y, benzil, fluorone dyes, benzil derivatives, ketocoumarins, acridine dyes, benzoflavin and combinations thereof, and suitable electron donors include, but are not limited to methyldiethanolamine, dimethyl-p-toluidine, N,N-dimethylaminoethyl methacrylate, ethyl 4-dimethylaminobenzoate and combinations thereof. And as regards three component initiators, in addition to the two components noted above, as the third component suitable oxidants include, but are not limited to bis(trichloromethyl)triazines, onium salts and combinations thereof. Examples of onium salts include sulfonium and iodonium salts. Other suitable visible photo-initiator systems include a combination of a 3-keto-substituted cumarin compound and an active halogeno compound (U.S. Pat. No. 4,505,793 to Tamoto et al).

Optionally, photo-initiator synergists are employed as co-initiators. Suitable photo-initiator synergists include, for example, N-methyl-diethanol amine, triethanolamine 2-(butoxy)ethyl-4-dimethyaminobenzoate and reactive amine acrylates commercially available as EBECRYL P104, EBECRYL P105, and EBECRYL 7100 from Allnex, Frankfurt am Main, Germany. or CN 371, CN 373, CN 384, or CN 386 available commercially from Sartomer Company, Inc., Exton, Pa. Sartomer describes CN 373 as a reactive amine acrylate coinitiator that can be used in combination with a hydrogen abstracting photo-initiator, such as benzophenone or isopropyl thioxanthone (ITX), to promote free radical polymerization. CN 373 accelerates surface cure speed and helps overcome oxygen inhibition in UV-polymerizable coatings and inks. Sartomer describes CN 371, CN 384 and CN 386 as difunctional amine acrylate coinitiators which, when used in conjunction with a photosensitizer, such as benzophenone, promote rapid curing under UV light.

An exemplary coating composition includes a suitable amount of the photo-initiator. An exemplary composition includes greater than about 0.01 wt % of the photo-initiator, based on the total weight of the composition, such as greater than about 0.05 wt % of the photo-initiator based on total resin solid, or greater than about 0.08 wt % of the photo-initiator based on total resin solid. An exemplary composition includes less than about 10 wt % of the photo-initiator based on total resin solid, such as less than about 8 wt % of the photo-initiator based on total resin solid, or less than about 6 wt % of the photo-initiator based on total resin solid. In other embodiments, an exemplary composition includes at least 0.001, such as at least 0.01, for example at least 0.25, such as at least 0.5, for example at least 0.75, such as at least 1, for example at least 2, such as at least 2.2 wt % of the photo-initiator, based on total resin solid. In other embodiments, an exemplary composition includes less than 20, such as less than 15, for example less than 10, such as less than 5, for example less than 2.5, such as less than 2, for example less than 1, wt % of the photo-initiator, based on the total weight of the composition.

Thermal Binder

As noted above, an exemplary coating composition includes a thermal binder to obtain the ultimately desired cure/crosslinking during a full or complete polymerization stage, such as during a thermal cure process, utilizing a process chemistry different from the radiation-activated process, such as a melamine cure. In the thermal cure process, solvent drying, further curing of the partially polymerized radiation-polymerizable binder, and curing of the remaining binders of the initial composition such as melamines and polyols, polyols and isocyanates, amines and isocyanates, acid and epoxies, or a combination of different binder chemistries takes place. The further curing of the partially polymerized radiation-polymerizable binder can occur upon heating of the coating through spontaneous thermal polymerization of acrylates, with assistance of an added thermal initiator such as peroxides or azonitrile compounds, or through acrylate double bonds reacting with a co-reactant in Michael additions, such as an amine, thio, or acetoacetate.

Typical thermal binders that may be used include crosslinkable and crosslinking components. "Crosslinkable component" means a component that includes a compound, polymer or copolymer having functional crosslinkable groups positioned in the backbone of the polymer, pendant from the backbone of the polymer, terminally positioned on the backbone of the polymer, or a combination thereof. The crosslinkable component comprises a polymer having on an average 2 to 25 crosslinkable groups selected from the group consisting of hydroxyl, acetoacetoxy, carboxyl, primary amine, secondary amine, epoxy and a combination thereof. Polymers are crosslinkable, i.e. they can react with the functional groups on the crosslinking agents to form polymer networks. Crosslinkable polymers include acrylic polymers, such as, poly(meth)acrylates, meaning both polyacrylates and polymethacrylates, linear, branched, grafted, or segmented poly(meth)acrylates, polyacrylourethanes, polyurethanes, polyesters, branched copolyesters, oligomers, e.g. urethane oligomers, polyester urethanes, polyepoxides and carbamate functional polymers.

The term crosslinking component, often called crosslinking agent or crosslinker refers to a component having "crosslinking-functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of reacting with the functional groups on the resins (during the thermal curing step) to produce a coating in the form of crosslinked structures. Typical crosslinking agents have an average functionality higher than 2 per each molecule. Typical crosslinking component for above said crosslinkable groups is selected from the group consisting of polyisocyanate, blocked polyisocyanate, polyamine, ketimine, melamine, epoxy, polyacid and a combination thereof.

It would be clear to one ordinary skill in the art that generally certain combinations of crosslinking groups from crosslinking components crosslink with crosslinkable groups from the crosslinkable components. Some of those paired combinations include: 1. Ketimine crosslinking component generally crosslinks with acetoacetoxy crosslinkable groups. 2. Polyisocyanate and melamine crosslinking components generally crosslink with hydroxyl, primary and secondary amine crosslinkable groups. 3. Epoxy crosslinking component generally crosslinks with carboxyl, primary and secondary amine crosslink able groups. 4. Polyamine crosslinking component generally crosslinks with acetoacetoxy crosslinkable groups. 5. Polyacid crosslinking component generally crosslinks with epoxy crosslinkable groups. However, it should be noted that combinations of the fore going paired combinations could also be used.

The crosslinkable component can be functional polymers or resins such as acrylic polymer, polyesters, polyester-polyurethane polymer, a latex polymer, or combinations thereof. It is to be appreciated that other polymers may be included in the coating composition.

Non-limiting examples of suitable acrylic polymer for use in the thermal binder include a copolymer that is polymerized from a monomer mixture of one or more non-functional acrylate monomers and one or more functional methacrylate monomers. The details are described in U.S. Pat. No. 7,858,692. Acrylic polymer can also be conventionally polymerized from typical monomers, such as alkyl (meth) acrylates having alkyl carbon atoms in the range of from 1 to 18, and styrene and functional monomers, such as, hydroxyethyl acrylate and hydroxyethyl methacrylate.

Non-limiting examples of suitable polyesters for use in the thermal binder include a branched copolyester polymer. The branched copolyester polymer and process for production described in U.S. Pat. No. 6,861,495, which is hereby incorporated by reference, can be suitable. Monomers with multifunctional groups such as AxBy (x,y=1 to 3, independently) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The branched copolyester polymer can be conventionally polymerized from a monomer mixture containing a chain extender selected from the group of a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

The polyester-polyurethane polymer can be produced from the polyester and polyisocyanates. The polyester can be polymeric or oligomeric organic species with at least two hydroxyl-functionalities or two-mercapto functionalities and their mixtures thereof. Polyesters and polycarbonates with terminal hydroxy groups can be effectively used as the diols.

The polyurethane polymers may be produced by reacting polyisocyanate(s) with polyol(s) in the excess. In certain embodiments, low molar mass polyols defined by an empirical and structural formula, such as polyhydric alcohols are utilized to form the polyurethane polymer. Non-limiting examples of polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized to form the polyurethane polymer.

Aqueous polyurethane binders and their production are well known to the skilled person. Typical and useful non-limiting examples of aqueous polyurethane binders comprise aqueous polyurethane binder dispersions which can typically be made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender like, for example, a polyamine, a hydrazine derivative or water. Such aqueous polyurethane binder dispersions as have been used as binders in water-borne base coat compositions as are conventional in the production of base coat/clear coat two-layer coatings of car bodies and body parts can be used in coating composition A; non-limiting examples of aqueous polyurethane binder dispersions which can be used in coating composition A can be found in U.S. Pat. Nos. 4,851,460, 5,342,882 and US 2010/0048811 A1, which are expressly incorporated herein by reference.

One non-limiting example of a polyester-polyurethane polymer is a polyurethane dispersion resin formed from a linear polyester diol resin (reaction product of monomers 1,6-hexanediol, adipic acid, and isophthalic acid) and isophorone diisocyanate.

Another non-limiting example of a polyester-polyurethane polymer is a polyurethane dispersion resin formed from a linear polycarbonate-polyester and isophorone diisocyanate.

The latex polymers, such as aqueous (meth)acryl copolymer latex binders (latex dispersions) and their production, are well known to the skilled person. Aqueous (meth)acryl copolymer latex binders can typically be made by free-radical emulsion copolymerization of olefinically unsaturated free-radically copolymerizable comonomers. For example, WO2006/118974 A1, WO2008/124136 A1, WO2008/124137 A1 and WO2008/124141 A1, which are expressly incorporated herein by reference, disclose aqueous (meth)acryl copolymer latex binders and their use as binders in water-borne base coat compositions as are conventional in the production of base coat/clear coat two-layer coatings of car bodies and body parts. The aqueous (meth)acryl copolymer latex binders disclosed in WO2006/118974 A1, WO2008/124136 A1, WO2008/124137 A1 and WO2008/124141 A1, which are expressly incorporated herein by reference, are non-limiting examples of aqueous (meth)acryl copolymer latex binders which can be used in the coating composition.

Melamines having melamine-functional groups may be utilized as the crosslinking agent to react with polymers with hydroxyl groups. Melamines may be partially or fully etherified with one or more alcohols like methanol or butanol. A non-limiting example is hexamethoxymethyl melamine. Non-limiting examples of suitable melamine resins include monomeric melamine, polymeric melamine-formaldehyde resin, or a combination thereof. The monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to 2 and, in certain embodiments, in the range of from 1.1 to 1.8, and have a proportion of mononuclear species not less than 50 percent by weight. By contrast the polymeric melamines have an average degree of condensation of more than 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines. In exemplary embodiments, the coating composition includes a melamine-formaldehyde resin having the tradename Cymel® 303 which is commercially available from Cytec Industries Inc. of West Patterson, N.J.

Polyisocyanates having isocyanate-functional groups may be utilized as the crosslinking agent to react with the crosslinkable-functional groups on the crosslinkable component, such as hydroxyl-functional groups and amine-functional groups. In certain embodiments, only primary and secondary amine-functional groups may be reacted with the isocyanate-functional groups.

Non-limiting examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate. Other polyisocyanates disclosed herein can also be suitable for producing polyurethanes.

Non-limiting examples of suitable polyisocyanates include any of the conventionally used aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Polyisocyanate-functional adducts having isocyanaurate structural units can also be used, for example, the adduct of 2 molecules of a diisocyanate, such as, hexamethylene diisocyanate or isophorone diisocyanate, and a diol such as ethylene glycol; the adduct of 3 molecules of hexamethylene diisocyanate and 1 molecule of water (commercially available from Covestro under the trade name Desmodur® N); the adduct of 1 molecule of trimethylol propane and 3 molecules of toluene diisocyanate (commercially available from Covestro under the trade name Desmodur® L); the adduct of 1 molecule of trimethylol propane and 3 molecules of isophorone diisocyanate or compounds, such as 1,3,5-triisocyanato benzene and 2,4,6-triisocyanatotoluene; and the adduct of 1 molecule of pentaerythritol and 4 molecules of toluene diisocyanate.

Ketimines useful in the present invention are typically prepared by the reaction of ketones with amines. Representative ketones, which may be used to form the ketimine, include acetone, methyl ethyl ketone, methyl isopropyl ketone, methyl isobutyl ketone, diethyl ketone, benzyl methylketone, diisopropyl ketone, cyclopentanone, and cyclohexanone. Representative amines which may be used to form the ketimine include ethylene diamine, ethylene triamine, propylene diamine, tetramethylene diamine, 1,6-hexamethylene diamine, bis(6-aminohexyl)ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines Preparation and other suitable imines are shown in U.S. Pat. No. 6,297,320, herein incorporated by reference. It should be noted that when the copolymer contains only acetoacetoxy functional groups, then ketimine is typically as a crosslinking component.

Suitable polyamines include primary and secondary amines, such as, ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12 diamine, 7-methyl-4,10-dioxatridecane-1,13-diamine, 1,2 diaminocyclohexane, 1,4-diaminocyclohexane, 4,4' diminodicyclohexyl methane, isophorone diamine, bis(3 methyl-4-aminocyclohexyl)methane, 2,2-bis(4 aminocyclohexyl)propane, nitrile tris(ethane amine), bis(3 aminopropyl)methylamine, 3-amino-1-(methylamino) propane, 3-amino-1-(cyclohexylamino)propane, and N-(2 hydroxyethyl)ethylene diamine. Ethylenediamine, propylenediamine, butylenediamine and 1,2-diaminocyclo hexane are preferred.

Suitable epoxy crosslinking components contain at least two glycidyl groups and can be an oligomer or a polymer, such as sorbitol polyglycidyl ether, mannitol polyglycidyl ether, pentaerythritol polyglycidol ether, glycerol polyglycidyl ether, low molecular weight epoxy resins, such as epoxy resins of epichlorohydrin and bisphenol A., di- and polyglycidyl esters of acids, polyglycidyl ethers of isocyanurates.

Suitable polyacid crosslinking components include aliphatic acids, such as succinic, maleic, fumaric, glutaric, adipic, azeleic, and sebacic acids; cycloaliphatic polycarboxylic acids, such as tetrahydrophthalic acid, hexahydrophthalic acid, 1,2-cyclohexanedicarboxylic acid, 1,3-cyclohexanedi carboxylic acid, 1,4-cyclohexanedicarboxylic acid, 4-methylhexahydrophthalic acid, tricyclodecanedicarboxylic acid, cyclohexanetetracarboxylic acid and cyclobutanetetracarboxylic acid; aromatic polycarboxylic acids, such as phthalic acid, isophthalic acid, terephthalic acid, halogenophthalic acids, such as, tetrachloro- or tetrabromophthalic acid, trimellitic acid, and pyromellitic acid.

The thermal binder can optionally include in the range of from 0.1 percent to 30 percent, preferably in the range of from 5 percent to 25 percent, more preferably in the range of from 10 percent to 20 percent, all in weight percent ages based on the total weight of thermal binder solids, additional crosslinkers, such as aldimine and polyaspartic esters. Details are described in U.S. Pat. No. 7,858,692.

The coating composition may include the thermal binder in an amount of from 0.5 to 90 wt %, such as from 5 to 70 wt %, for example from 10 to 50 wt %, or from 15 to 50 wt %, based on a total weight of the coating composition.

Liquid Carrier

An exemplary coating composition includes a liquid carrier medium that comprises an organic solvent or blend of solvents or an aqueous carrier comprising water and optionally, compatible organic solvents. The coating compositions contain from 5 to 95 wt %, such as from 10 to 85 wt %, of solvent, and from 5 to 95 wt %, such as from 15 to 90 wt %, of an organic liquid carrier (based on the weight of the coating composition). The selection of organic solvent depends upon the requirements of the specific end use application of the coating composition, such as the VOC emission requirements, the selected pigments, binder and crosslinking agents. Representative examples of organic solvents which are useful herein include alcohols, such as methanol, ethanol, n-propanol, and isopropanol, butanol, pentanol; ketones, such as acetone, butanone, pentanone, hexanone, and methyl ethyl ketone, methyl isobutyl ketone, diisobutyl ketone, methyl amyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers, such as cellosolves and carbitols; and glycols, such as ethylene glycol and propylene glycol and mixtures thereof, and aromatic hydrocarbon solvents, such as xylene, toluene. Typically, aqueous carriers comprise water and a blend of organic solvents suited for the requirements of the coating composition.

Pigment

Pigments are optional in the coating composition. For example, in certain embodiments, the coating composition may be substantially free of a pigment or dye. The term "substantially" as utilized herein means that the coating composition may include insignificant amounts of pigment or dye such that the color and/or properties of the coating composition are not impacted by the addition of the insignificant amount of the pigment or dye which still being considered substantially free of a pigment or dye. In embodiments, the coating composition being substantially free of a pigment or dye includes no greater than 5 wt %, alternatively no greater than 1 wt %, or alternatively no greater than 0.1 wt % or no greater than 0.01 wt %.

In certain embodiments, the coating composition includes a pigments or pigments. Any pigment known in the art for use in coating compositions may be utilized in the coating composition. An exemplary coating composition may include a pigment in an amount of at least 0.1, such as at least 0.5, for example at least 1 wt %, based on a total weight of the coating composition. An exemplary coating composition may include a pigment in an amount of at most 30, such as at most 20, for example at most 10 wt %, based on a total weight of the coating composition.

Additives

As introduced above, the coating composition may optionally include further additives.

For example, the coating composition may include a thermal initiator. An exemplary thermal initiator may be provided to initiate complete curing of the coating composition, i.e., for further reaction of the partially polymerized binder. Exemplary thermal initiators include peroxides or azo compounds, and mixtures thereof. The peroxide may be a peroxyester or a ketone peroxide. Examples of peroxyesters include t-butylperoxybenzoate, methyl ethyl ketone peroxide, 1,1-di(t-butylperoxy)-3,5,5-trimethylcyclohexane, 1,1-di(t-amylperoxy)cyclohexane, t-butylperoxy-2-ethylhexanoate and t-amylperoctoate. Examples of azo compounds could be azobis (alkyl nitrile) peroxy such as 2,2'-azobis-(2,4-dimethylvaleronitrile), azobisisobutyronitrile, and 2,2'-azobis-(2-methylbutyronitrile); t-butyl-peroxymaleic acid, 1,1'-azobis-(1-cyclohexanecarbonitrile). In general, the amount of thermal initiator used in the coating composition is from 0.001 to 10 wt %, such as from 0.01 to 5 wt %.

Further, the coating composition may include a catalyst to reduce curing time and/or to reduce curing temperature during the complete curing process at an elevated temperature or to allow curing of the coating composition at ambient temperatures. The ambient temperatures are typically referred to as temperatures in a range of from 18° C. to 35° C. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof.

As introduced above, the coating composition may further include rheology control agents or modifiers. Many different types of rheology control agents can be used in coating compositions may be utilized in the coating composition. For example, a rheology control agent can be used that may increase rheology of the coating composition as compared to a coating composition free of the rheology control agent. An increase in rheology of the coating composition may improve suitability of the coating composition for application to the substrate utilizing the high transfer efficiency applicator. Non-limiting examples of suitable rheology control agents include urea-based compounds, laponite propylene glycol solutions, acrylic alkali emulsions, and combinations thereof. In certain embodiments, the coating composition includes the laponite propylene glycol solution, the acrylic alkali emulsion, or a combination thereof. The laponite propylene glycol solution includes a synthetic layered silicate, water, and polypropylene glycol. The synthetic layered silicate is commercially available from Altana AG of Wesel, Germany under the trade name Laponite RD. The acrylic alkali emulsion is commercially available from BASF Corporation of Florham Park, New Jersey under the tradename Rheovis® AS 1130.

The coating composition may further include wetting agents, flow control agents, surfactants, UV light stabilizers, fillers, plasticizers and other conventional additives. Non-limiting examples of ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals of Tarrytown, New York, under the trade name Tinuvin®, can be utilized. The coating compositions may further include other additives known in the art for use in coating compositions, such as functional additives configured to improve properties of the coating composition. The functional additive may be selected from the groups of anti-sag agent, pH modifier, catalyst, surface tension modifier, solubility modifier, adhesion promoter, and combinations thereof.

Referring now to FIG. 1, a high transfer efficiency applicator 12 for applying an exemplary coating composition to a substrate 10 is illustrated. The high transfer efficiency applicator 12 may be any high transfer efficiency applicator known in the art so long as it is suitable for printing the coating composition. The high transfer efficiency applicator 12 may be configured as continuous feed. The high transfer efficiency applicator 12 may apply the coating composition via valve jet, piezo-electric, thermal, acoustic, or ultrasonic membrane. The illustrated high transfer efficiency applicator 12 includes a nozzle defining a nozzle orifice 72 for jetting the coating composition.

The high transfer efficiency applicator 12 is configured to expel the coating composition through the nozzle orifice 72 to the substrate 10 to form a coating layer. The coating layer may be formed in the presence of high-energy radiation. The high-energy radiation may be generated by a device configured to generate visible light, ultraviolet light, a laser, an electron beam, or combinations thereof. The device may be coupled to the high transfer efficiency applicator 12 and configured to direct the high-energy radiation toward the coating composition after expulsion through the nozzle orifice 72 of the high transfer efficiency applicator 12.

Placement of a visible light, UV, EB, or laser source on the high transfer efficiency applicator 12 may result in direct photo initiation of the coating composition after being applied to the substrate 10 by the high transfer efficiency applicator 12.

The radiation generating device may be mounted on another robot arm, or mount in the booth or mount in the oven or combination so the radiation can be used at desired timing after the coating layer applied to the substrate and before the final thermal cure to achieve desired surface appearance and sag resistance.

The high transfer efficiency applicator 12 is illustrated as being part of a system 50 for applying coating compositions. The system 50 may include more than one high transfer efficiency applicators 12 with each configured to apply a different coating composition (e.g., different colors, solid or effect pigments, basecoat or clearcoat) or may be configured to increase the flow rate. However, it is to be appreciated that a single high transfer efficiency applicator 12 may be utilized to apply a variety of different coating compositions.

The exemplary system 50 further includes a reservoir (not identified) in fluid communication with the high transfer efficiency applicator 12 and configured to contain the coating composition. The high transfer efficiency applicator 12 is configured to receive the coating composition from the reservoir and configured to expel the coating composition through the nozzle orifice 72 to the substrate 10 to deposit a coating layer thereon. The reservoir may be directly coupled to the high transfer efficiency applicator 12 or indirectly coupled to the high transfer efficiency applicator 12 via one or more tubes. More than one reservoir with each of the reservoirs containing different coating compositions (e.g., different colors, solid or effect pigments, basecoat or clearcoat, 2-pack coating compositions) may be coupled to the high transfer efficiency applicator 12 for providing different coating compositions to the same high transfer efficiency applicator 12.

As shown, the substrate 10 may be disposed within an environment including an over-spray capture device 102. As indicated, an air flow may move through the environment and to the over-spray capture device 102. Because the applicator is a high transfer efficiency applicator, no more than 3 wt % of the coating composition expelled from the high transfer efficiency applicator 12 contacts the over-spray capture device 102, based on a total weight of the coating composition. In other embodiments, no more than 1 wt % or no more than 0.1 wt %, of the coating composition expelled from the high transfer efficiency applicator 12 contacts the over-spray capture device 102, based on a total weight of the coating composition. The over-spray capture device 102 may include a filter, a scrubber, or combinations thereof.

The substrate 10 may include a metal-containing material, a plastic-containing material, or a combination thereof. In certain embodiments, the substrate 10 may be porous, such as a wood or paper substrate. In certain embodiments, the substrate 10 is substantially non-porous. The term "substantially non-porous" as utilized herein means that at least 95%, at least 96%, at least 97%, at least 98%, at least 99% of a surface of the coating layer is free of pores. The coating composition may be utilized to coat any type of substrate 10 known in the art. In embodiments, the substrate 10 is a vehicle, automobile, or automobile vehicle. "Vehicle" or "automobile" or "automobile vehicle" includes an automobile, such as, car, van, minivan, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; ceramic tiles; stationary structures; bridges; pipes; cellulosic materials (e.g., woods, paper, fiber, etc.). The coating composition may also be utilized to coat substrates in consumer products applications such as helmets; baseball bats; bicycles; and toys. It is to be appreciated that the term "substrate" as utilized herein can also refer to a coating layer disposed on an article that is also considered a substrate.

Figure 2:
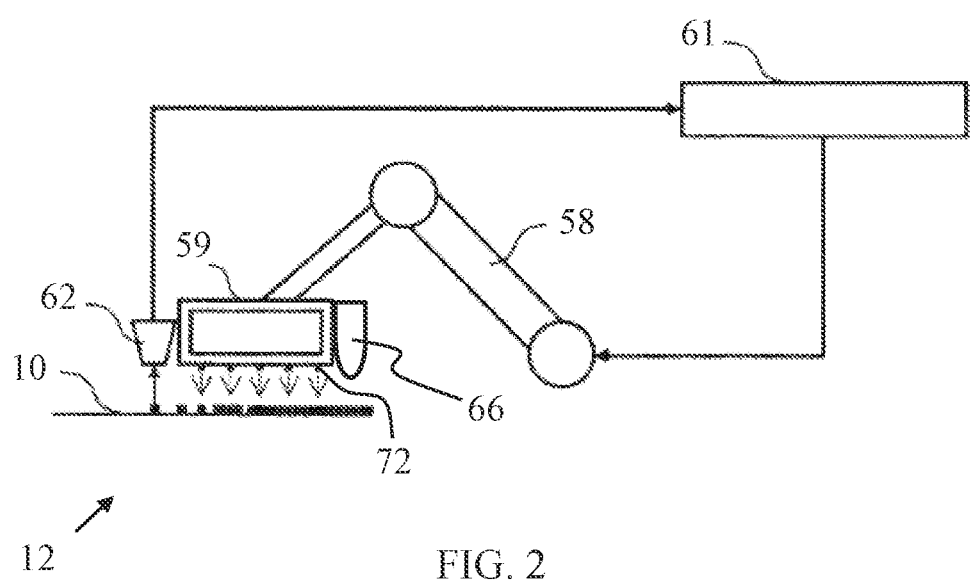
FIG. 2 is a schematic view illustrating a non-limiting embodiment of a high transfer efficiency applicator in accordance with embodiments herein.

With reference to FIG. 2, in certain embodiments, the coating composition may be applied using a high transfer efficiency applicator 12 as described in U.S. Pat. No. 10,814,643, assigned to Dun Systems GmbH, the disclosure of which is incorporated herein. As shown, the exemplary applicator 12 includes a print head 59 having one or more nozzles 72 through which the coating composition passes during application. As shown, the applicator 12 is provided with a multiple axis robot 58 which controls the print head 59 and an optical sensor 62 in order to position the print head. The multiple axis robot 58 is configured to move the print head 59 along predefined coating agent paths over a substrate 10 under the control or a robot controller 61. The robot controller 61 controls the robot 58 in such a way that the print head 59 is guided along predefined coating agent paths over the component surface 60 whereby the coating agent paths lie adjacent to each other in a meandering pattern. The optical sensor 62 detects the position and course of the previous coating agent paths so that the current coating agent path can be exactly aligned with regard to the previous coating agent path.

The radiation emission device 66 may be located at any suitable location. For example, the radiation emission device 66 may be on the print head, on a separate dedicated robot arm, near the oven, or in any other desired location. In exemplary embodiments, a radiation emission device 66 is mounted to or near the print head 59. An exemplary radiation emission device 66 may be a visible light lamp, a UV lamp, or an electron beam emitter. During operation of such an embodiment, the radiation emission device 66 moves with the print head 59 and may direct radiation, such as UV, to the just-applied coating composition within the desired time after deposition for the desired duration, as described above, to partially polymerize the composition after application to the substrate. In other embodiments, the radiation emission device 66 may move independent of the print head or may be stationary.

In other embodiments, the radiation emission device 66 may be independent of, and/or not move with, the print head 59. In such embodiments, the radiation emission device 66 is still configured to direct radiation, such as UV, to the just-applied coating composition within the desired time after deposition for the desired duration, as described above, to partially polymerize the composition after application to the substrate.

As noted above, the applicator 12 of FIG. 2 is a high transfer efficiency applicator configured to eject the coating composition in an engineered/controlled fashion to create a fine stream, that may or may not breakup into droplets with essentially no overspray (drops missing their target) and nearly 100% transfer efficiency (all paint goes to targeted location on the substrate).

Figure 3A:
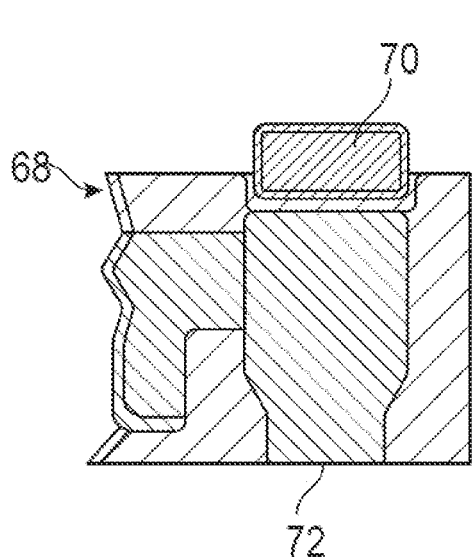
FIGS. 3A, 3B, 3C, and 3D are cross-sectional perspective views illustrating a non-limiting embodiment of a high transfer efficiency applicator in accordance with embodiments herein.
Figure 3B:
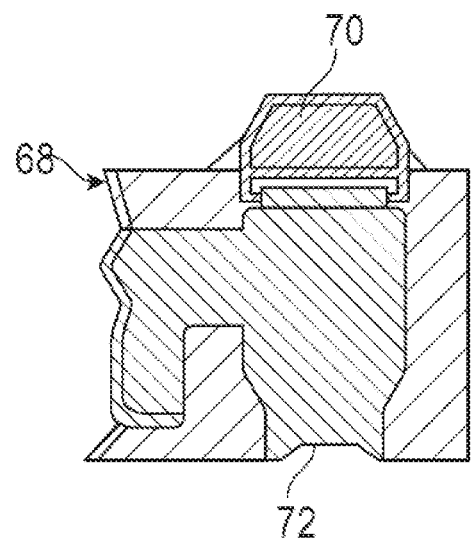
Figure 3C:
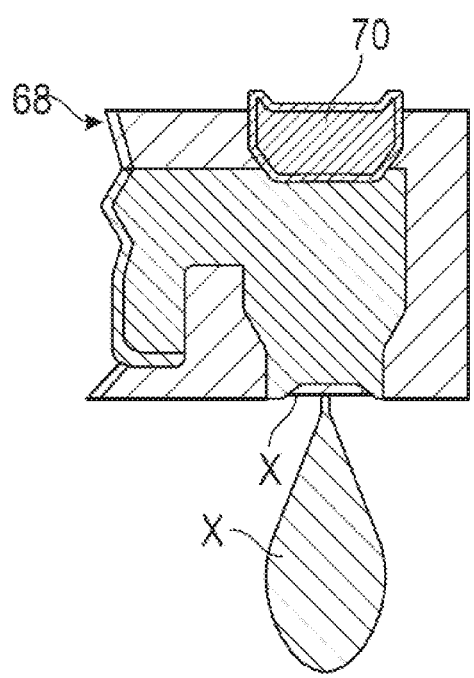
Figure 3D:
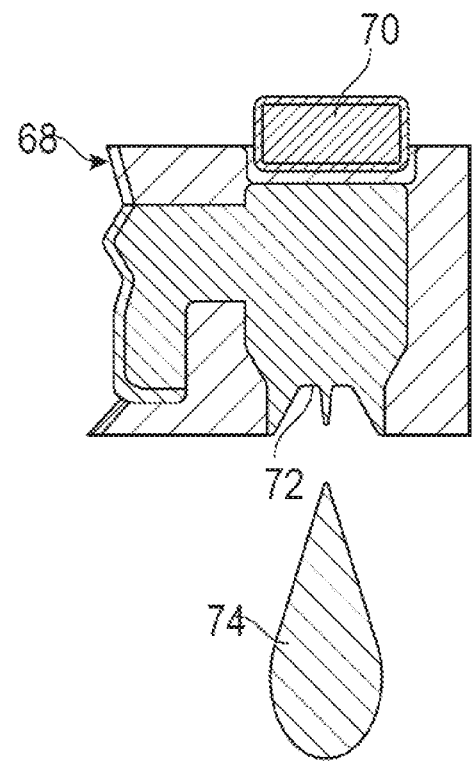

With reference to FIGS. 3A, 3B, 3C, and 3D, in certain embodiments, the high transfer efficiency applicator 12 is a piezoelectric applicator 68 configured to apply the coating composition. The piezoelectric applicator 68 includes a piezoelectric element 70 configured to deform between a draw position, a rest position, and an application position. The piezoelectric applicator 68 further includes the nozzle with a nozzle orifice 72 through which a droplet 74 of the coating composition is applied. It is to be appreciated that each high transfer efficiency applicator may include more than one nozzle, such as for applying a coating composition including effect pigments which may require a larger nozzle orifice. In FIG. 3A, the piezoelectric element 70 is in a rest position. In FIG. 3B, the piezoelectric element 70 is in a draw position to draw in the coating composition from the reservoir. In FIG. 3C, the piezoelectric element 70 is in an application position to expel the coating composition from the piezoelectric applicator 68 thereby forming the droplet 74. FIG. 3D, the piezoelectric element 70 returns to the rest position.

Figure 4:
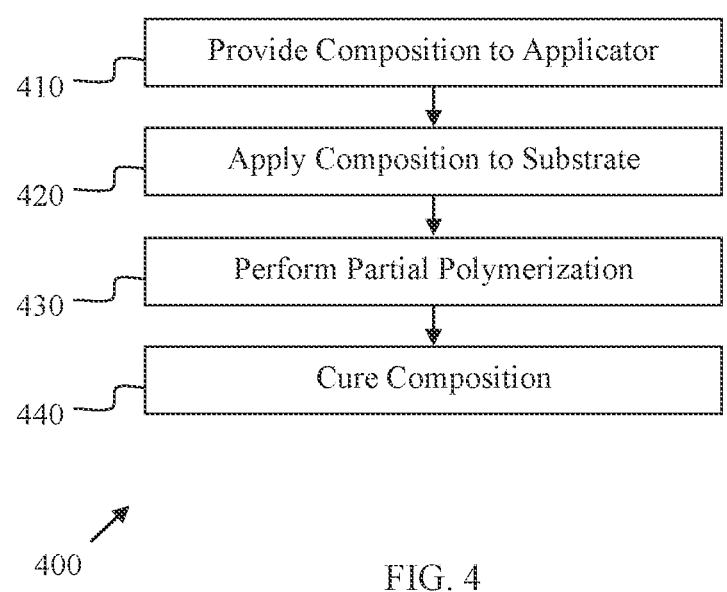
FIG. 4 is a flow chart illustrating a method for forming a coating layer from the coating composition in accordance with embodiments herein.

In FIG. 4, a method 400 for forming a coating layer on a substrate utilizing the coating composition is illustrated. The method 400 includes providing the coating composition to a high transfer efficiency applicator at action block 410 and applying the coating composition to the substrate through the nozzle orifice of the high transfer efficiency applicator to form a coating layer from the applied coating composition at action block 420. As applied, the applied coating composition is wet because little solvent is lost through evaporation during application via the high transfer efficiency applicator.

In order to increase the viscosity of the applied coating composition and to improve sag performance, the method 400 includes, at action block 430, performing a partial polymerization. In exemplary embodiments, a radiation exposure is performed at a desired time after application of the coating and for a desired duration, as described above.

For example, visible light exposure, UV light exposure or electron beam radiation exposure is performed. An exemplary system 50 includes a radiation emission device. In exemplary embodiments, the radiation emission device is distanced from the substrate by one inch or by four inches. The radiation emission device may be distanced from the substrate by any suitable distance, including closer than 5 mm, between 5 mm and 100 mm, and farther than 100 mm. During the partial polymerization process, network gelation has not occurred.

Radiation exposure can be performed by any suitable device or system and may be performed at any suitable wavelength of irradiation. For example, UV exposure can be performed with any suitable UV lamp such as an arc lamp, a microwave unit or a UV LED. In an exemplary embodiment, the UV exposure is performed with an LED UV lamp. UV LED lamps use light-emitting diodes which convert electrical current into light. When the electrical current flows through an LED, it gives off ultraviolet radiation. Such a lamp does not have the wide spectral distribution, or wide range, of UV irradiation typical of a mercury lamp or hydrogen bulb. An exemplary lamp is mainly in UVV range (395 nm). In an exemplary embodiment, the UV exposure is performed by an LED UV lamp that generates less than 3600 mJ/cm$^2$ of UV light exposure over 20 seconds of irradiation. In an exemplary embodiment, the intensity of the UV light exposure is less than 350 mW/cm$^2$, such as from 50 to 150 mW/cm$^2$, such as from 75 to 125 mW/cm$^2$, for example from 90 to 100 mW/cm$^2$. Higher intensity UV light may be used, such as at the 10 W/cm$^2$ scale (such as Prophotonix COBRA™ Cure). Even higher intensity UV lamp such as 1000 W/cm$^2$ scale (Electrodeless, Mercury Vapor Lamps by Henkel) can be used. The highest intensity UV lights can shorten the exposure to milliseconds. Further, the exemplary LED lamp does not have any heat generated during the process. In exemplary embodiments, the coating is not heated during the partial polymerization process.

Visible light sources, particularly high intensity visible light, can also be used to apply the radiation exposure when the visible light photo-initiator is used. The visible light source may be a metal halide or a mercury based lamp (such as mercury arc, metal halide, halogen and fluorescent lamps), equipped to eliminate radiation below 400 nm, a LED that emits radiation above 400 nm or an OLED that emits radiation above 400 nm. When equipped with an appropriate filter to prevent the emission of radiation other than that in the visible range of the electromagnetic spectrum, the mercury-based lamp source of visible light for instance will emit solely visible light, which thus will be the only radiation available to cure the polymerizable composition.

The method 400 further includes curing the composition at action block 440. For example, a thermal cure may be performed. During the curing process, complete polymerization occurs, with full curing and formation of a cross-linked network. In an exemplary embodiment, an ambient temperature thermal cure process is performed to fully cure the partially cured acrylate. In another exemplary embodiment, a high temperature baking process is performed to fully cure the partially cured acrylate. During the high temperature baking process, the remaining acrylate functional groups continue free-radical polymerization. A thermal initiator may be included in the coating composition to generate free radicals for polymerization of the partially cured acrylate or other double bond groups in the baking process.

The thermal cure process may be performed at a temperature in a range of from 18° C. (64° F.) to 180° C. (356° F.). The coating layer may be cured for an amount of time of from 10 minutes to 3 days. The process may further include the step of allowing the first wet coating layer to flash.

The thermal cure process may include drying of the coating composition. Thermal curing/drying components may be included in the system 50. Examples of suitable drying components may include, but are not limited to, cure ovens, forced air dryers, infrared lamps, and the like.

Experiments

Partial polymerization is used herein to describe the initial process, after deposition of the coating, to increase the viscosity of the coating through radiation exposure, for example through UV exposure. The following experiment illustrates that UV exposure described herein and performed with a limited wavelength LED UV lamp does not result in curing, gelation, or formation of a cross-linked network. In other words, the compositions never reach their gel point during the partial polymerization process.

In the experiment, samples were prepared with the following compositions A1-A4, B1-B4, and C1-C4. Testing of the samples was performed as follows: The samples were draw down on LENETA drawdown chart with gradient drawdown bar with 1-6 mil or 3-12 mil gap for sag evaluation (ASTM D4400). The paint was then exposed to the UV for desired length of time at a distance of from 1 inch or 4 inches above. Then the chart was turned vertical to allow the paint to sag due to gravity force for at least 5 min. The sag was evaluated by visual assessment at the UV exposed region. The sag resistance results are recorded as the largest gap that shows no sag. A separate control (0 sec UV exposure) was drawdown with the same sample and flash at room temperature for the same length of time and then turn vertically for comparison. For rheology test, drawdown bar of 8 mil gap was used. The drawdown paint then exposed to the UV for desired length of time and collected for rheology measurement. The non-UV exposed control specimen of the same sample was collected after the drawdown and flash for the same length of time.

TABLE A

|  | A1 | A2 | A3 | A4 |
|---|---|---|---|---|
| Enamel resin | 15.3 | 14.8 | 14.1 | 13.3 |
| Hydroxy functional acrylic resin 1 | 24.4 | 23.7 | 22.4 | 21.2 |
| Hydroxy functional acrylic resin 2 | 3.8 | 3.7 | 3.5 | 3.3 |
| Acrylic dispersion 1 | 4.1 | 4.0 | 3.8 | 3.6 |
| Acrylic dispersion 2 | 5.2 | 5.1 | 4.8 | 4.5 |
| Melamine resin 1 | 17.8 | 17.3 | 16.3 | 15.4 |
| Melamine resin 2 | 4.1 | 4.0 | 3.8 | 3.6 |
| Solvent-borne black pigment dispersion | 4.4 | 4.3 | 4.0 | 3.8 |
| N-butanol | 4.7 | 4.6 | 4.3 | 4.1 |
| Dipropylene glycol methyl ether | 0.5 | 0.5 | 0.5 | 0.4 |
| Butyl acetate | 6.1 | 5.9 | 5.6 | 5.3 |
| Others (UV absorber, catalyst, leveling agent, amine, surfactant, additives) | 6.4 | 6.2 | 5.9 | 5.6 |
| CN9062 | 2.0 | 5.0 | 9.9 | 14.9 |
| Omnirad TPO | 1.0 | 1.0 | 1.0 | 1.0 |
| Total | 100 | 100 | 100 | 100 |
| Viscosity at 250 s$^{-1}$ in mPa · s | 187 | 178 | 210 | 258 |

TABLE B

|  | B1 | B2 | B3 | B4 |
|---|---|---|---|---|
| Enamel resin | 15.3 | 14.8 | 14.1 | 13.3 |
| Hydroxy functional acrylic resin 1 | 24.4 | 23.7 | 22.4 | 21.2 |
| Hydroxy functional acrylic resin 2 | 3.8 | 3.7 | 3.5 | 3.3 |
| Acrylic dispersion 1 | 4.1 | 4.0 | 3.8 | 3.6 |
| Acrylic dispersion 2 | 5.2 | 5.1 | 4.8 | 4.5 |
| Melamine resin 1 | 17.8 | 17.3 | 16.3 | 15.4 |
| Melamine resin 2 | 4.1 | 4.0 | 3.8 | 3.6 |
| Solvent-borne black pigment dispersion | 4.4 | 4.3 | 4.0 | 3.8 |
| N-butanol | 4.7 | 4.6 | 4.3 | 4.1 |
| Dipropylene glycol methyl ether | 0.5 | 0.5 | 0.5 | 0.4 |
| Butyl acetate | 6.1 | 5.9 | 5.6 | 5.3 |
| Others (UV absorber, catalyst, leveling agent, amine, surfactant, additives) | 6.4 | 6.2 | 5.9 | 5.6 |
| HDDA | 2.0 | 5.0 | 9.9 | 14.9 |
| Omnirad TPO | 1.0 | 1.0 | 1.0 | 1.0 |
| Total | 100 | 100 | 100 | 100 |
| Viscosity at 250 s$^{-1}$ in mPa · s | 143 | 130 | 101 | 85 |

TABLE C

|  | C1 | C2 | C3 | C4 |
|---|---|---|---|---|
| Enamel resin | 15.3 | 14.8 | 14.1 | 13.3 |
| Hydroxy functional acrylic resin 1 | 24.4 | 23.7 | 22.4 | 21.2 |
| Hydroxy functional acrylic resin 2 | 3.8 | 3.7 | 3.5 | 3.3 |
| Acrylic dispersion 1 | 4.1 | 4.0 | 3.8 | 3.6 |
| Acrylic dispersion 2 | 5.2 | 5.1 | 4.8 | 4.5 |
| Melamine resin 1 | 17.8 | 17.3 | 16.3 | 15.4 |
| Melamine resin 2 | 4.1 | 4.0 | 3.8 | 3.6 |
| Solvent-borne black pigment dispersion | 4.4 | 4.3 | 4.0 | 3.8 |
| N-butanol | 4.7 | 4.6 | 4.3 | 4.1 |
| Dipropylene glycol methyl ether | 0.5 | 0.5 | 0.5 | 0.4 |
| Butyl acetate | 6.1 | 5.9 | 5.6 | 5.3 |
| Others (UV absorber, catalyst, leveling agent, amine, surfactant, additives) | 6.4 | 6.2 | 5.9 | 5.6 |
| Laromer PE8981 | 2.0 | 5.0 | 9.9 | 14.9 |
| Omnirad TPO | 1.0 | 1.0 | 1.0 | 1.0 |
| Total | 100 | 100 | 100 | 100 |
| Viscosity at 250 s$^{-1}$ in mPa · s | 162 | 177 | 209 | 251 |

TABLE D

| | Description |
|---|---|
| Enamel resin | Low Tg (<20° C.) hydroxyl functional acrylic resin, MW~7,000, 65 wt % solid in aromatic hydrocarbon solvent |
| Hydroxy functional acrylic resin 1 | MW~34,500, 65% solid in aromatic hydrocarbon solvent |
| Hydroxy functional acrylic resin 2 | MW~5,500, 75% solid in aromatic hydrocarbon solvent |
| Acrylic dispersion 1 | 50% solid in organic solvent mixture (aliphatic and aromatic hydrocarbon, alcohol, and butyl acetate). Particle size is around 300 nm |
| Acrylic dispersion 2 | 60% solid in organic solvent mixture (aliphatic and aromatic hydrocarbon and alcohols). Particle size is around 250 nm. |
| Melamine resin 1 | Methylated, isobutylated, with high degree of alkylation (hexaether) melamine formaldehyde resin |
| Melamine resin 2 | Methylated, iminiotype (Triether) melamine formaldehyde resin |
| Solvent-borne black pigment dispersion | 18% carbon black, 18% acrylic dispersant, 63% organic solvents |
| Opaque sag control agent in resin solution | 5% crystal sag control agent, 80% branched hydroxy functional (138 mg KOH/g) polyester resin Mw~10,000 Tg~−30° C. in n-butyl acetate |

Wherein all measurements are by parts by weight or weight percent; CN9062 refers to urethane acrylate radiation-polymerizable binder; HDDA is hexanediol diacrylate polymer radiation-polymerizable binder; Laromer LR 8981 refers to polyester-modified acrylic resin radiation-polymerizable binder; and Omnirad TPO is photo-initiator.

The following table provides the sagging resistance for each formula with no UV exposure and with UV exposure of 2800 mJ/cm$^2$. This demonstrates improved sag resistance.

TABLE E

| | Sagging Resistance (higher is better) | | | |
|---|---|---|---|---|
| | A1 | A2 | A3 | A4 |
| No UV | <3 | 3 | <3 | <3 |
| 2800 mJ/cm$^2$ | 3 | 5 | 3 | 7 |
| | B1 | B2 | B3 | B4 |
| No UV | <3 | <3 | <3 | <3 |
| 2800 mJ/cm$^2$ | 6 | 4 | 5 | 3 |
| | C1 | C2 | C3 | C4 |
| No UV | 4 | <3 | 5 | <3 |
| 2800 mJ/cm$^2$ | 5 | 3 | 6 | 7 |

For example, the following table illustrates that sagging resistance is not caused by gelation of the binder system. In the table, eta*=complex viscosity in Pa·s.

TABLE F

| | Freq sweep | | | |
|---|---|---|---|---|
| | eta* 10 rad/s | tan d 10 rad/s | eta* 0.1 rad/s | tan d 0.1 rad/s |
| A1 | | | | |
| w/UV 2800 mJ/cm$^2$ | 0.532 | 6.11 | 0.602 | 331 |
| w/o UV | 0.347 | 4.23 | 0.371 | 713 |
| Change | 53% | | 62% | |
| A4 | | | | |
| w/UV 2800 mJ/cm$^2$ | 0.755 | 7.23 | 0.935 | 98.2 |
| w/o UV | 0.532 | 6.89 | 0.649 | 559 |
| Change | 42% | | 44% | |
| B1 | | | | |
| w/UV 2800 mJ/cm$^2$ | 0.345 | 4.49 | 0.372 | 708 |
| w/o UV | 0.273 | 3.57 | 0.287 | 1850 |
| Change | 26% | | 30% | |
| B4 | | | | |
| w/UV 2800 mJ/cm$^2$ | 0.213 | 3.17 | 0.200 | 2520 |
| w/o UV | 0.161 | 2.31 | 0.146 | 485 |
| Change | 33% | | 37% | |
| C1 | | | | |
| w/UV 2800 mJ/cm$^2$ | 0.497 | 5.246 | 0.557 | 305 |
| w/o UV | 0.409 | 4.78 | 0.439 | 922 |
| Change | 22% | | 27% | |
| C4 | | | | |
| w/UV 2800 mJ/cm$^2$ | 0.694 | 6.29 | 0.850 | 113 |
| w/o UV | 0.475 | 5.17 | 0.541 | 489 |
| Change | 46% | | 57% | |

As shown in the data of the table, tan delta remains larger than 1 after the UV exposure, indicating that gelation has not yet occurred.

In the following experiment, a base formula (see Table D for description) was prepared with the addition of trimethylolpropane triacrylate (TMPTA) as the UV monomer and Omnirad TPO as the photo-initiator in different amounts for samples D1-D4. As shown, each sample was prepared with an appropriate initial viscosity for application through a high transfer efficiency applicator, i.e., 28 or 30 cP, at a shear rate of 1000 s$^{-1}$. Testing was performed as described above in relation to Examples A1-A4, B1-B4, and C1-C4. As shown, samples D1 and D2 still performed poorly, with a sag limit of 0 mils after UV exposure. However, after UV exposure, sample D3 had a sag limit of 5 mils and sample D4 had a sag limit of 12 mils. Likewise, the viscosity increase after UV exposure for sample D3 and sample D4 was drastic. Sample D4 shows excellent sag resistance but also poor appearance.

Solvent-Borne Examples.

TABLE G

|  | D1 | D2 | D3 | D4 |
|---|---|---|---|---|
| Enamel resin | 29.8 | 29.2 | 27.6 | 26.7 |
| Melamine resin 1 | 14.0 | 13.8 | 13.0 | 12.6 |
| Solvent-borne black pigment dispersion | 3.0 | 2.9 | 2.7 | 2.6 |
| Butyl acetate | 35.1 | 33.9 | 33.8 | 31.6 |
| Opaque sag control agent in resin solution | 13.6 | 13.4 | 12.6 | 12.2 |
| TMPTA | 1.4 | 3.6 | 7.2 | 11.1 |
| OMNIRAD TPO | 2.1 | 2.2 | 2.2 | 2.2 |
| Others (UV absorber, catalyst, leveling agent, amine, surfactant, additives) | 1.0 | 1.0 | 0.9 | 0.9 |
| Pre-application Viscosity @ 1000 s$^{-1}$ (cP) | 30 | 30 | 28 | 30 |
| Post-application: |  |  |  |  |
| Sag limit without UV exposure (draw down bar mil) | <3 | <3 | <3 | <3 |
| Sag limit after 1700 mJ/cm$^2$ UV exposure (draw down bar mil) | <3 | <3 | 5 | 12 |
| Viscosity @ 1000 s$^{-1}$ (cP) with no UV exposure (room temperature flash for the same amount of time) | 40 | 40 | 49 | 39 |
| Viscosity @ 0.1 s$^{-1}$ (cP) with no UV exposure | 81 | 83 | 88 | 71 |
| Viscosity @ 1000 s$^{-1}$ (cP) after 1700 mJ/cm2 UV exposure | 84 | 94 | 153 | 424 |
| Viscosity @ 0.1 s$^{-1}$ after 1700 mJ/cm$^2$ UV exposure | 178 | 192 | 7090 | 175000 |
| Compare post application viscosity with and without UV exposure |  |  |  |  |
| Viscosity increase @ 0.1 s$^{-1}$ | 120% | 131% | 7956% | >10000% |
| Viscosity increase @ 1000 s$^{-1}$ | 110% | 135% | 212% | 987% |

Water-Borne Examples

TABLE H

|  | E1 | E2 | E3 |
|---|---|---|---|
| Water-borne base formulation | 97 | 97 | 97 |
| Sartomer SR454 | 2 |  |  |
| Laromer UA 8949 |  | 2 |  |
| Laromer PE 22 |  |  | 2 |
| Omnirad 819 DW | 1 | 1 | 1 |
| pH | 8.1 | 8.2 | 8.2 |
| Pre-application Viscosity at 1000 s$^{-1}$ (cP) | 26 | 26 | 35 |
| Post-application: |  |  |  |
| Sag resistance without UV exposure (largest drawdown bar gap without sagging) | 1.5 | <0.5 | 3.5 |
| Sag resistance after 2400 mJ/cm$^2$ UV exposure (largest drawdown bar gap without sagging) | 2.5 | 1.5 | 4.5 |

Water-Borne Base Formulation

TABLE I

| Description | | wt % |
|---|---|---|
| Acrylic latex dispersion | Styrene-acrylic latex dispersion, 46 wt % solid, Tg~–7° C., acid number ~12, hydroxyl number ~7 | 24.4 |
| Water | | 2.0 |
| Polyurethane dispersion | Polyurethane dispersion resin formed from a linear polyester diol resin (reaction product of monomers 1,6-hexanediol, adipic acid, and isophthalic acid) and isophorone diisocyanate. About 35 wt % solid | 33.0 |

TABLE I-continued

| Description | | wt % |
|---|---|---|
| Aqueous black pigment dispersion | Aqueous dispersion of amorphous carbon black pigment, 9 wt % carbon black, 8 wt % acrylic dispersant | 26.4 |
| Melamine resin 3 | Hexa(methoxymethyl)melamine (HMMM) melamine formaldehyde resin commercially available from Allnex under the trade name Cymel 303 | 11.9 |
| Others (catalyst, UV absorber, surfactant, amine, additives) | | 2.3 |
| Total | | 100 |

For Examples E1-E3, the samples were prepared with an initial viscosity of 26 or 35 cP, at a shear rate of 1000 s$^{-1}$. Testing was performed as described above in relation to Examples A1-A4, B1-B4, and C1-C4. As shown, all samples improved in sag resistance after UV exposure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of applying a coating composition to a substrate utilizing an applicator to form a coating layer disposed on the substrate, said method comprising the steps of:
    providing the coating composition to the applicator;
    applying the coating composition onto the substrate utilizing the applicator to form an applied layer with an application efficiency greater than 80%, wherein a loss of volatiles after application through the applicator is less than about 1 weight percent based on a total weight of the coating composition;
    performing a partial polymerization via radiation of the applied layer; and
    after performing the partial polymerization of the applied layer, thermally curing and drying the applied layer;
    wherein the coating composition comprises:
        a thermal binder;
        a radiation-polymerizable binder;
        optionally, a photo-initiator;
        optionally, a thermal-initiator;
        optionally, a pigment; and
        a liquid carrier;
    wherein the coating composition has a pre-application viscosity, at a shear rate of 1000 $s^{-1}$, of less than about 100 centipoise (cP);
    wherein the coating composition has a post-radiation-exposure viscosity, at a shear rate of 0.1 $s^{-1}$, of from about 500 cP to about 150,000 cP;
    wherein the thermal binder is a polymer or resin with crosslinkable groups selected from the group consisting of hydroxyl, acetoacetoxy, carboxyl, primary amine, secondary amine, epoxy and a combination thereof and crosslinking components selected from the group consisting of polyisocyanate, blocked polyisocyanate, polyamine, ketimine, melamine, epoxy, polyacid and a combination thereof.

2. The method of claim 1 wherein the post-radiation-exposure viscosity, at a shear rate of 0.1 $s^{-1}$, is from about 1000 cP to about 150,000 cP, from about 2000 cP to about 150,000 cP, or from about 5000 cP to about 150,000 cP.

3. The method of claim 1 wherein the coating composition comprises a desired amount of the radiation-polymerizable binder based on total resin solid, wherein the desired amount is selected from about 0.5 to about 60 wt %, from about 1 to about 40 wt %, and from about 2 to about 30 wt %.

4. The method of claim 3 wherein the radiation sources can be attached onto the high efficiency applicator head or mounted to a separate robot arm or mount in the booth or mount in the oven or combination so the radiation can be used at desired timing after the coating layer applied to the substrate and before the final thermal cure to achieve desired surface appearance and sag resistance.

5. The method of claim 1 wherein the coating composition further comprises a desired amount of photo-initiator, based on the total weight of the composition, wherein the desired amount is selected from about 0.01 to about 10 wt %, from about 0.05 to about 8 wt %, and from about 0.08 to about 6 wt %.

6. The method of claim 1 wherein the radiation-polymerizable binder contains functional groups other than acrylate or vinyl double bonds that can react with other functional groups in remaining binder during a post-radiation bake process.

7. The method of claim 1 wherein the liquid carrier can be water, organic solvents or a combinations thereof.

8. The method of claim 1 wherein the radiation sources can be attached onto the high efficiency applicator head or mount to a separate robot arm or mount in the booth or mount in the oven or combination so the radiation can be used at desired timing after the coating layer applied to the substrate and before the final thermal cure to achieve desired surface appearance and sag resistance.

9. A method for forming a layer of a coating composition on a substrate, the method comprising:
    applying the coating composition onto the substrate utilizing an applicator to form an applied layer with an application efficiency greater than 80%, wherein a loss of volatiles after application through the applicator is less than about 1 weight percent based on a total weight of the coating composition;
    after leveling of the applied layer, performing a partial polymerization via radiation of the applied layer; and
    after performing the partial polymerization of the applied layer, thermally curing and drying the applied layer,
    wherein before applying the coating composition onto the substrate, the coating composition has a pre-application viscosity at a shear rate of 1000 $s^{-1}$ of less than about 100 centipoise (cP); and
    wherein after performing the partial polymerization of the applied layer, the coating composition has a post-radiation-exposure viscosity at a shear rate of 0.1 $s^{-1}$ selected from at least 500 cP, at least 1000 cP, at least 2000 cP, and at least 5000 cP.

10. The method of claim 9 wherein the coating composition includes a radiation polymerizable binder, and wherein performing the partial polymerization of the applied layer comprises exposing the applied layer to radiation.

11. The method of claim 9 wherein the coating composition includes a photo-initiator and a radiation-polymerizable binder, and wherein performing the partial polymerization of the applied layer comprises exposing the applied layer to radiation.

12. The method of claim 9 wherein:
    after performing the partial polymerization of the applied layer, the coating composition has a post-radiation-exposure viscosity at a shear rate of 0.1 $s^{-1}$ of at least 5000 cP.

13. The method of claim 9 wherein the coating composition includes a photo-initiator and a polymerizable binder, and wherein performing the partial polymerization of the applied layer comprises exposing the applied layer to radiation generated by an LED lamp.

14. The method of claim 9 wherein the coating composition includes a photo-initiator and a visible light polymerizable binder, and wherein performing the partial polymerization of the applied layer comprises exposing the applied layer to visible light.

* * * * *